United States Patent [19]

Patel et al.

[11] Patent Number: 5,722,715
[45] Date of Patent: Mar. 3, 1998

[54] ENERGY ABSORBING AUTOMOTIVE VEHICLE BODY STRUCTURE

[75] Inventors: Rasik N. Patel, Canton; Guy Allen Breckenridge, Westland; Saeed David Barbat, Farmington Hills, all of Mich.

[73] Assignee: Ford Global Technologies, Inc., Dearborn, Mich.

[21] Appl. No.: 786,943

[22] Filed: Jan. 23, 1997

[51] Int. Cl.⁶ ................................................. B60R 21/04
[52] U.S. Cl. ........................................... 296/189; 280/751
[58] Field of Search ............................ 296/189; 280/751

[56] References Cited

U.S. PATENT DOCUMENTS

| | | |
|---|---|---|
| 3,779,595 | 12/1973 | Suzuki et al. . |
| 3,831,705 | 8/1974 | Glance . |
| 5,163,730 | 11/1992 | Welch . |
| 5,445,430 | 8/1995 | Nichols . |
| 5,544,933 | 8/1996 | Shahab et al. . |
| 5,575,500 | 11/1996 | Mimura et al. ............... 296/189 X |

*Primary Examiner*—Joseph D. Pape
*Attorney, Agent, or Firm*—Daniel M. Stock, Esq.; Roger L. May, Esq.

[57] ABSTRACT

An automotive vehicle body structure includes a structural member which forms a load-bearing structure on the vehicle. The structural member presents an edge extending generally toward the interior of the vehicle. A trim component is mounted to the structural member and covers the edge. A high density elastic sleeve is mounted to the edge and spaced from, but adjacent to, the trim component. The edge and the high density elastic sleeve are deformable in response to a force acting thereon to absorb and dissipate the energy generated by the forces.

20 Claims, 2 Drawing Sheets

ENERGY ABSORBING AUTOMOTIVE VEHICLE BODY STRUCTURE

BACKGROUND OF THE INVENTION

1. Field of the Invention

The present invention relates generally to automotive vehicle body structure and, more specifically, to the construction of automotive vehicle body structure to accommodate energy absorption.

2. Description of the Related Art

Trim components are used in automotive applications to present an aesthetically pleasing appearance in the interior of the vehicle, to smooth contours and to cover structural load-bearing components of the vehicle. For example, trim components are employed for these purposes in connection with the A, B, C, and D pillars of the vehicle, the side rails and the roof rails or the front and rear headers.

In the design of modern automotive vehicles, it has been a goal to provide body structures which manage the absorption of energy in response to the imposition of frontal loads. More recent activity in the vehicle body arts has been directed to the management of energy imposed on the vehicle occupant compartment in response to loads imposed on the sides of the vehicle and to loading imposed within the vehicle occupant component.

Thus, in addition to the load-bearing functions of such structural components of the vehicle, these body structures are sometimes required to absorb energy from forces generated from the interior of the vehicle in the event of an impact or collision. It has been found that there is a need in the art for load-bearing structural members such as pillars, side rails, roof rails, and front and rear headers having enhanced energy absorbing capabilities which also meet the design objectives identified above without sacrificing the interior space of the vehicle.

SUMMARY OF THE INVENTION

The present invention meets the needs of the art in an energy absorbing automotive vehicle body structure. More specifically, the present invention is directed toward a structural member, such as a pillar, which forms a load-bearing structure on the vehicle. The pillar presents an edge extending generally toward the interior of the vehicle. A trim component is mounted to the pillar and covers the edge. A high density elastic sleeve is mounted to the edge spaced from, but adjacent to, the trim component. The edge and the high density elastic sleeve are deformable in response to a force acting thereon to absorb and dissipate the energy generated by the force.

One feature of the present invention is that it may be employed in connection with all structural, load-bearing members of an automotive vehicle on which a trim component is mounted. The present invention is especially adapted for use in connection with upper structural components such as A, B, C, and D pillars which present edges directed toward the interior of the vehicle such as when two or more sheet metal, structural components are joined together. Another feature of the present invention is that it effectively absorbs and dissipates energy generated due to the force of an impact without sacrificing the interior space of the vehicle.

Other features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
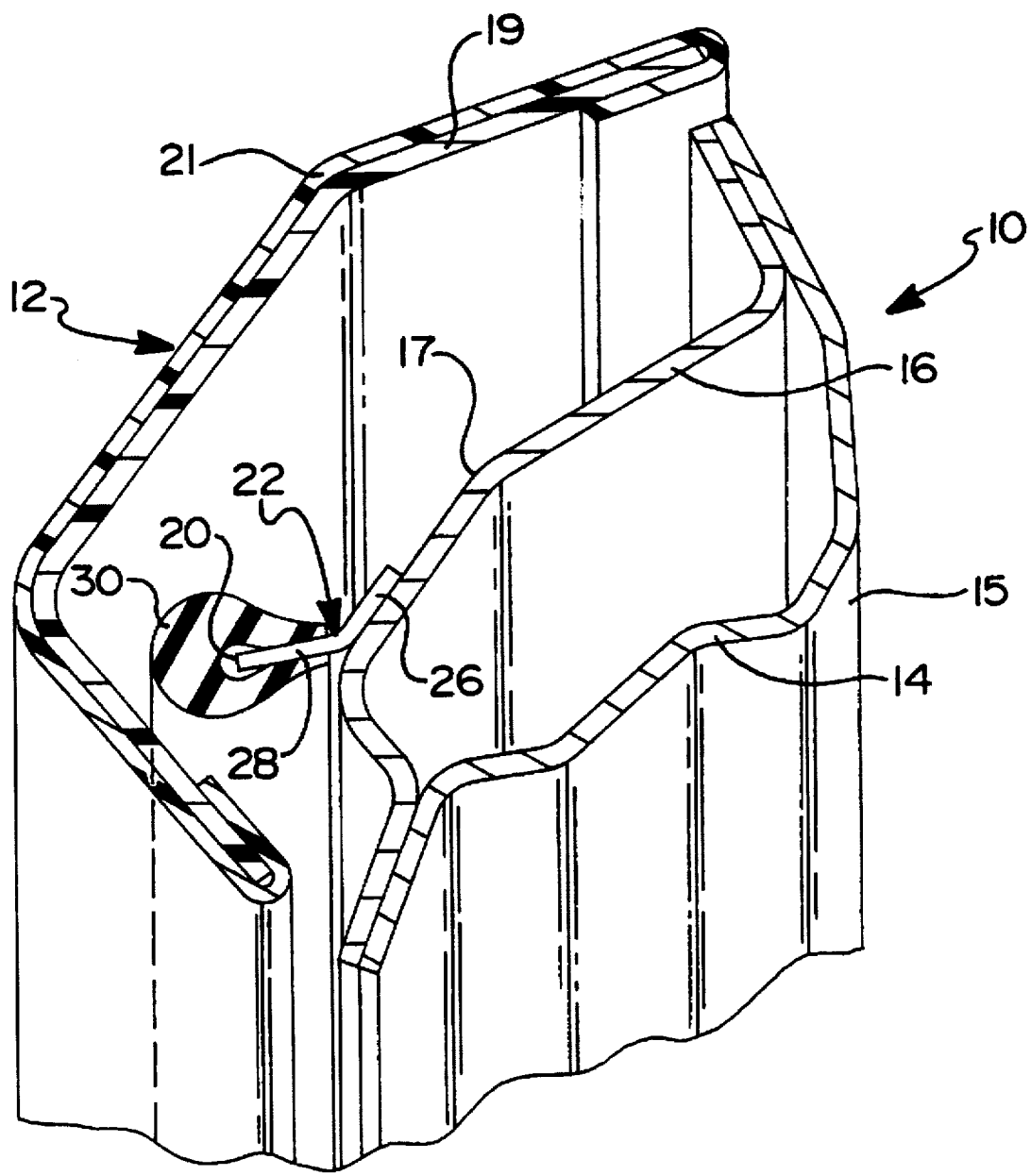
FIG. 1 is a perspective view of the structural member of the present invention with a cross-section taken therethrough.

The present invention is directed toward an energy absorbing automotive vehicle body structural member generally indicated at 10 throughout the figures. Trim components 12 are often employed in connection with structural components 10 on automotive vehicles. The structural components 10 often associated with interior trim components may include A, B, C and D pillars as well as side and roof rails. It will be appreciated, however, that the structural member 10 having a trim component 12 mounted thereto of the present invention may be employed at many locations in a vehicle to present an aesthetically pleasing appearance in the interior of the vehicle.

As illustrated in the figures, the structural member is a pillar 10 which forms a load-bearing structure on the vehicle. The pillar 10 includes an outer panel 14 and an inner panel 16. The panels 14 and 16 are made of sheet metal and are fixedly secured to one another at their lateral edges by welding to form a load bearing pillar 10 with the trim component 12 mounted to the inner panel 16.

Figure 2:
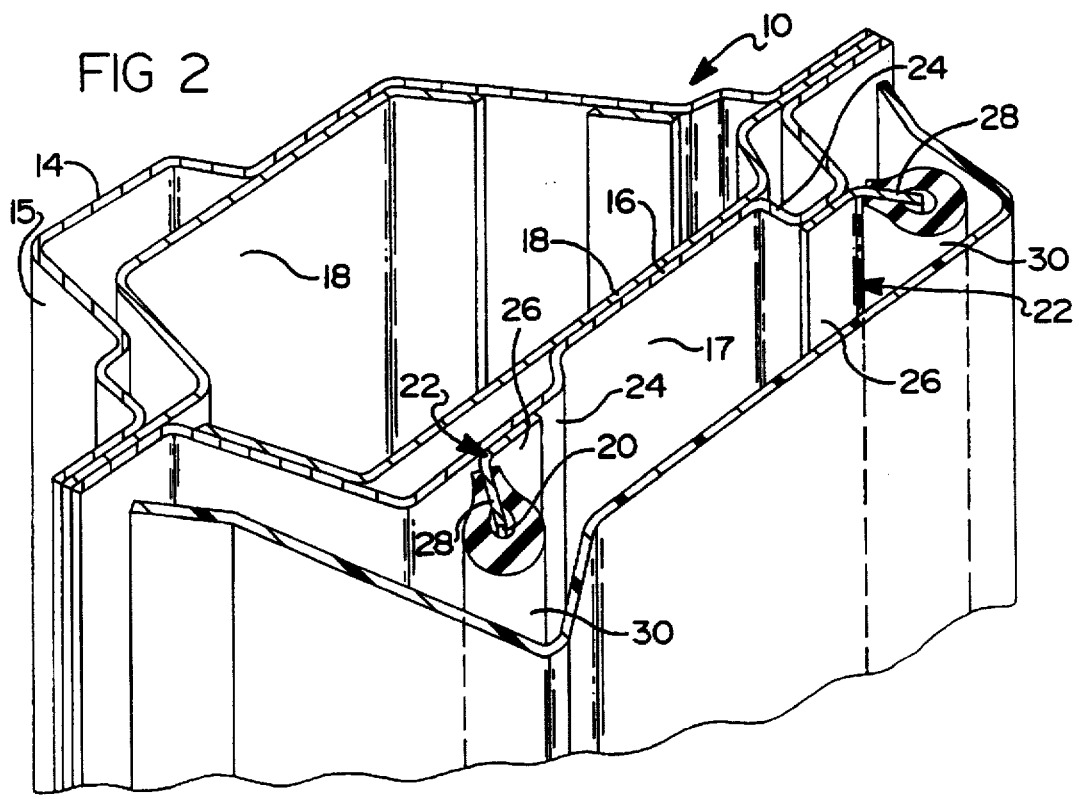
FIG. 2 is a perspective view of another embodiment of the structural member of the present invention with a cross-section taken therethrough.
Figure 3:
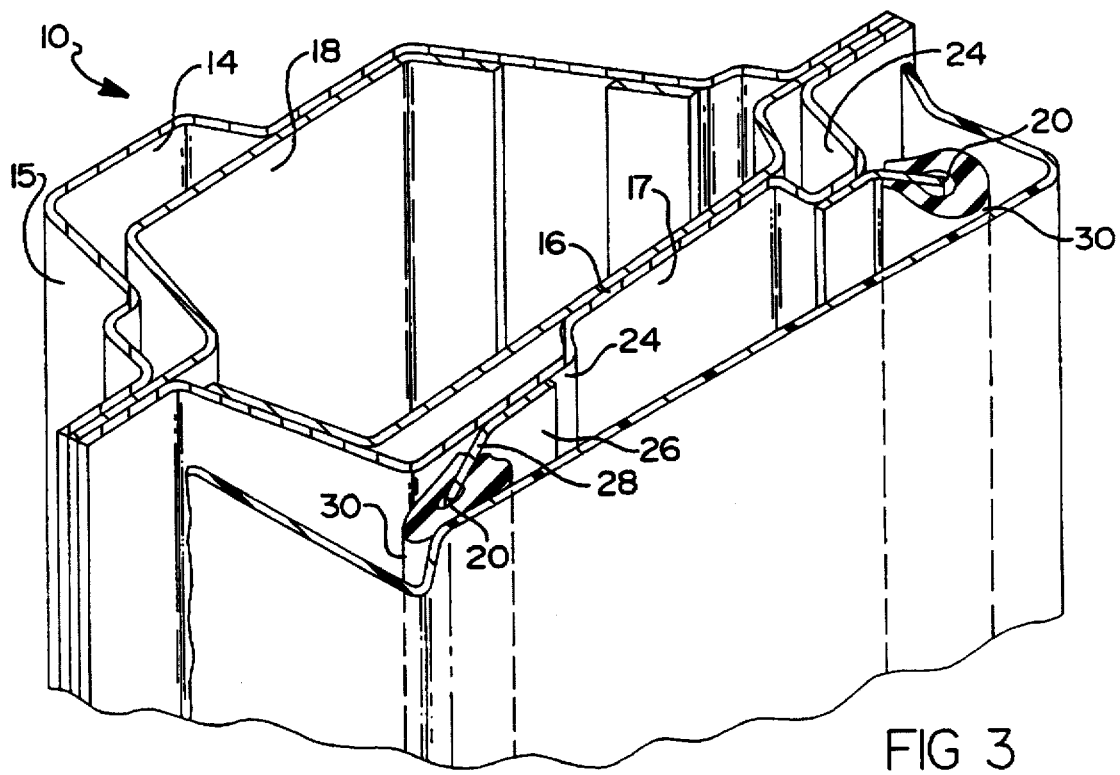
FIG. 3 is a perspective view of a structural member as shown in FIG. 2 with a cross-section taken therethrough and illustrating the energy absorbing features thereof upon impact.

As illustrated in the figures, the outer panel 14 is arranged in a generally vertical orientation to define outwardly convex exterior surface 15 of the vehicle. Similarly, the inner panel 16 is arranged in longitudinal registration with the outer panel 14 and defines surface 17 which is convex with respect to the interior of the vehicle. As shown in FIGS. 2 and 3, the pillar 10 may include at least one or more reinforcement panels 18 which are disposed between the inner and the outer panels 16 and 14, respectively. When so constructed, it is not uncommon for the pillar 10 to present an edge 20 which extends generally toward the interior of the vehicle (not shown). The edge 20 may be formed at the weld joint between the inner and outer panels 16 and 14 or may be the result of a number of independent design considerations. However, it will be understood by those having skill in the art that similar edges may be presented by the joint formed by two or more panels which make up the structural member and that the present invention is in no way limited to the specific structure which forms the edge as described herein and illustrated in the Figures.

In the embodiment illustrated in the Figures, the edge may be presented by a generally L-shaped flange, generally indicated at 22, which extends along a substantial portion of the length of the pillar 10. As illustrated in the figures, the flange 22 presents the edge 20. Typically, the flange 22 may be mounted to the inner panel 16.

A trim component 12 is mounted to the pillar 10 and covers the edge 20. The trim component 12 is typically made of plastic and presents a class A surface in the interior of the vehicle. As illustrated in FIG. 1, the trim component 12 may include a plastic substrate 19 which is covered by an aesthetically pleasing material such as cloth, leather, or a plastic skin 21. The trim component 12 is mounted to the pillar using conventional fasteners well known in the art.

As best shown in FIGS. 2 and 3, the inner panel 16 includes an energy absorbing portion 24. The flange 22 is fixedly secured such as by welding to the energy absorbing portion 24 of the inner panel 16 of the pillar 10. Further, the pillar 10 may include a pair of flanges 22 spaced relative to one another and extending longitudinally along a substantial portion of the length of the pillar 10. Each flange 22 presents an edge 20.

Each flange 22 has a first portion 26 which is fixedly secured to the inner panel 16 of the pillar 10 and a second portion 28 which extends toward the trim component 12 and the interior of the vehicle. The second portion 28 is disposed at an angle relative to the first portion 26. More specifically, the second portion 28 may be disposed at an obtuse angle relative to the first portion 26.

A high density elastic sleeve 30 is mounted to the edge 20 on the second portion 28 and is disposed spaced from, but adjacent to the trim component 12. This clearance is designed to reduce the possibility of squeak, rattle or interference during assembly and operation of the vehicle. The sleeve 30, like the edge 20 of the second portion 28 of the flange 22, extends longitudinally along a substantial length of the edge 20. And, in the case of FIGS. 2 and 3, a pair of high density elastic sleeves 30 are mounted on the flanges 22 at the edges 20. The sleeves 30 may be made of high density rubber, foam, or the like.

The edges 20 and the high density elastic sleeves 30 are deformable in response to a force acting thereon to absorb and dissipate the energy generated by the force. More specifically, the second portion 28 is deformable relative to the first portion 26 of the flange 22 so as to absorb and dissipate the energy. The entire flange 22 or just the second portion 28 may be made of an energy absorbing substrate.

As illustrated in FIG. 3, upon impact, the trim component 12 flexes and begins to absorb energy. Once the trim component 12 contacts the sleeve 30, the elastic bulb-like sleeve 30 deforms absorbing more impacted energy. Finally, the second portion 28 of the flange 22 collapses or bends absorbing even more energy before the sheet metal of the pillar 10 is impacted. Furthermore, the sleeves 30 mounted to the edges 20 may be arranged to maximize absorption of energy in the likely direction of the forces that will be imparted to the structural member 10 in the event of a collision. In this way, the energy absorbing structural member 10 of the present invention responds to forces acting thereon to absorb and dissipate the energy generated by the force. Further, these objectives and advantages are achieved in connection with an aesthetically pleasing trim component 12 which covers the structural member without sacrificing the interior space of the vehicle.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An automotive vehicle body structure comprising:

a structural member which forms a load-bearing portion of a vehicle, said structural member presenting an edge extending generally toward an interior of the vehicle;

a trim component mounted to said structural member and covering said edge; and a high density elastic sleeve mounted to said edge and spaced from, but adjacent to, said trim component, said high density elastic sleeve having a bulbous shape and wherein said edge and said high density elastic sleeve are deformable in response to a force acting thereon to absorb and dissipate the energy generated by the force.

2. An automotive vehicle body structure as set forth in claim 1 wherein said edge extends longitudinally along a substantial length of said structural member, said sleeve extending longitudinally along the substantial length of said edge.

3. An automotive vehicle body structure as set forth in claim 1 wherein said structural member includes a pillar having an outer panel and an inner panel, said panels fixedly secured to one another to form said load-bearing pillar with said trim component mounted to said inner panel.

4. An automotive vehicle body structure as set forth in claim 3 wherein said inner panel presents said edge.

5. An automotive vehicle body structure as set forth in claim 4 wherein said pillar includes at least one reinforcement panel disposed between said inner and said outer panels.

6. An automotive vehicle body structure as set forth in claim 1 wherein said structural member includes a flange extending longitudinally along a substantial portion of the length of said structural member, said flange presenting said edge.

7. An automotive vehicle body structure as set forth in claim 6 wherein said flange has a first portion fixedly secured to said structural member and a second portion extending toward said trim component and the interior of the vehicle at an angle relative to said first portion.

8. An automotive vehicle body structure as set forth in claim 7 wherein said second portion is disposed at an obtuse angle relative to said first portion.

9. An automotive vehicle body structure as set forth in claim 7 wherein said second portion is deformable relative to said first portion so as to absorb and dissipate energy generated by the forces.

10. An automotive vehicle body structure as set forth in claim 9 wherein said second portion is made of an energy absorbing metal substrate, said high density elastic sleeve mounted to said edge presented by said second portion.

11. An automotive vehicle body structure as set forth in claim 6 wherein said structural member includes a pillar having an outer panel and an inner panel, said panels fixedly secured to one another to form said load-bearing pillar with said trim component mounted to said inner panel.

12. An automotive vehicle body structure as set forth in claim 11 wherein said inner panel includes an energy absorbing portion, said flange fixedly secured to said energy absorbing portion of said inner panel of said pillar.

13. An automotive vehicle body structure comprising:

a structural member which forms a load-bearing portion of a vehicle, said structural member including a pair of flanges spaced relative to one another and extending longitudinally along a substantial portion of the length thereof, each flange presenting an edge extending generally toward an interior of the vehicle;

a trim component mounted to said structural member and covering said flanges; and a pair of high density elastic sleeves mounted to said flanges at said edges spaced from, but adjacent to, said trim component, wherein said edges and said high density elastic sleeves are deformable in response to a force acting thereon to absorb and dissipate the energy generated by the force.

14. An automotive vehicle body structure comprising:

a pillar which forms a load-bearing structure on a vehicle, said pillar including a flange extending longitudinally along a substantial portion of a length of said pillar, said flange presenting an edge extending generally toward an interior of the vehicle;

a trim component mounted to said pillar and covering said edge; and a high density elastic sleeve mounted to said edge and spaced from, but adjacent to, said trim component, said high density elastic sleeve having a bulbous shape and wherein said edge and said high density elastic sleeve are deformable in response to a force acting thereon to absorb and dissipate the energy generated by the force.

15. An automotive vehicle body structure as set forth in claim 14 wherein said flange has a first portion fixedly secured to said pillar and a second portion extending toward said trim component and the interior of the vehicle at an angle relative to said first portion.

16. An automotive vehicle body structure as set forth in claim 15 wherein said second portion is disposed at an obtuse angle relative to said first portion.

17. An automotive vehicle body structure as set forth in claim 15 wherein said second portion is deformable relative to said first portion so as to absorb and dissipate energy generated by the forces.

18. An automotive vehicle body structure as set forth in claim 17 wherein said second portion is made of an energy absorbing metal substrate, said high density elastic sleeve mounted to said edge presented by said second portion.

19. An automotive vehicle body structure comprising:

a pillar which forms a load-bearing structure on the vehicle, said pillar including a pair of flanges spaced relative to one another and extending longitudinally along a substantial portion of a length thereof, each flange having a first portion fixedly secured to said pillar and a second portion extending toward said trim component and an interior of the vehicle at an angle relative to said first portion, each of said second portions of said flanges presenting an edge;

a trim component mounted to said pillar and covering said edges; and a high density elastic sleeve mounted to each of said edges and spaced from, but adjacent to, said trim component, wherein said edges and said high density elastic sleeves are deformable in response to a force acting thereon to absorb and dissipate the energy generated by the force.

20. An automotive vehicle body structure as set forth in claim 19 wherein said second portion is disposed at an obtuse angle relative to said first portion.

* * * * *